Jan. 27, 1970 F. H. REES 3,492,431

DELTA MODULATION SYSTEM USING A CONSTANT CODE LENGTH LESS THAN THE AVAILABLE CODE LENGTH WITH AUTOMATIC RANGE SHIFT WITHIN THE AVAILABLE CODE LENGTH

Filed Oct. 13, 1965 2 Sheets-Sheet 1

Inventor
FREDERICK H. REES
By [signature]
Attorney

Inventor
FREDERICK H. REES
By Percy P. Lantzy
Attorney

United States Patent Office 3,492,431
Patented Jan. 27, 1970

3,492,431

DELTA MODULATION SYSTEM USING A CONSTANT CODE LENGTH LESS THAN THE AVAILABLE CODE LENGTH WITH AUTOMATIC RANGE SHIFT WITHIN THE AVAILABLE CODE LENGTH

Frederick Henry Rees, Aldwych, London, England, assignor to International Standard Electric Corporation, New York, N.Y., a corporation of Delaware Filed Oct. 13, 1965, Ser. No. 495,550
Claims priority, application Great Britain, Nov. 16, 1964, 46,535/64
Int. Cl. H04j 3/02
U.S. Cl. 179—15 11 Claims

ABSTRACT OF THE DISCLOSURE

This relates to PCM coding and decoding techniques which resembles delta modulation in that the code actually sent "tells" the receiver the difference between the present analog sample and the preceding analog sample. The code actually sent is a group of five bits selected from twelve bits. Range shift to a higher or lower binary weighted group of five bits is indicated and effected automatically when the difference exceeds a first level or falls below a second level. The same circuitry can be used as a coder or decoder.

The present invention relates to an electrical pulse code modulation system.

According to the present invention there is provided an electrical pulse code modulation system, in which an analog signal is represented by a binary pulse code combination the elements of which are weighted in accordance with a notation in which the weight of each element position exceeds the combined weights of all lower-denominational element positions, and in which each of said elements can have either a positive or a negative signification, said two significations being represented by different electrical conditions.

According to the present invention there is further provided an electrical pulse code modulation system, in which an analog signal is represented by a binary pulse code combination whose elements are weighted in accordance with binary digital notation, in which each code combination which is transmitted represents the difference between the amplitudes of the current analog signal sample and of the immediately preceding analog signal sample, in which the number of code elements transmitted is less than the full number of elements of the combination due to the current sample, the elements transmitted including the most significant element position of said combination, in which when the number to which the transmitted elements corresponds exceeds a first limit a range shift is made such that the elements transmitted have increased weights, in which when said number falls below a second limit a range shift is made such that the elements transmitted have lesser weights, and in which each said element can have either a positive or a negative signification, said two significations being represented by different electrical conditions.

As used in, for instance, an automatic telephone exchange, the different electrical conditions referred to in the previous paragraph would be positive and negative polarities.

An embodiment of the invention will now be described with reference to the accompanying drawings, in which.

Figure 1:
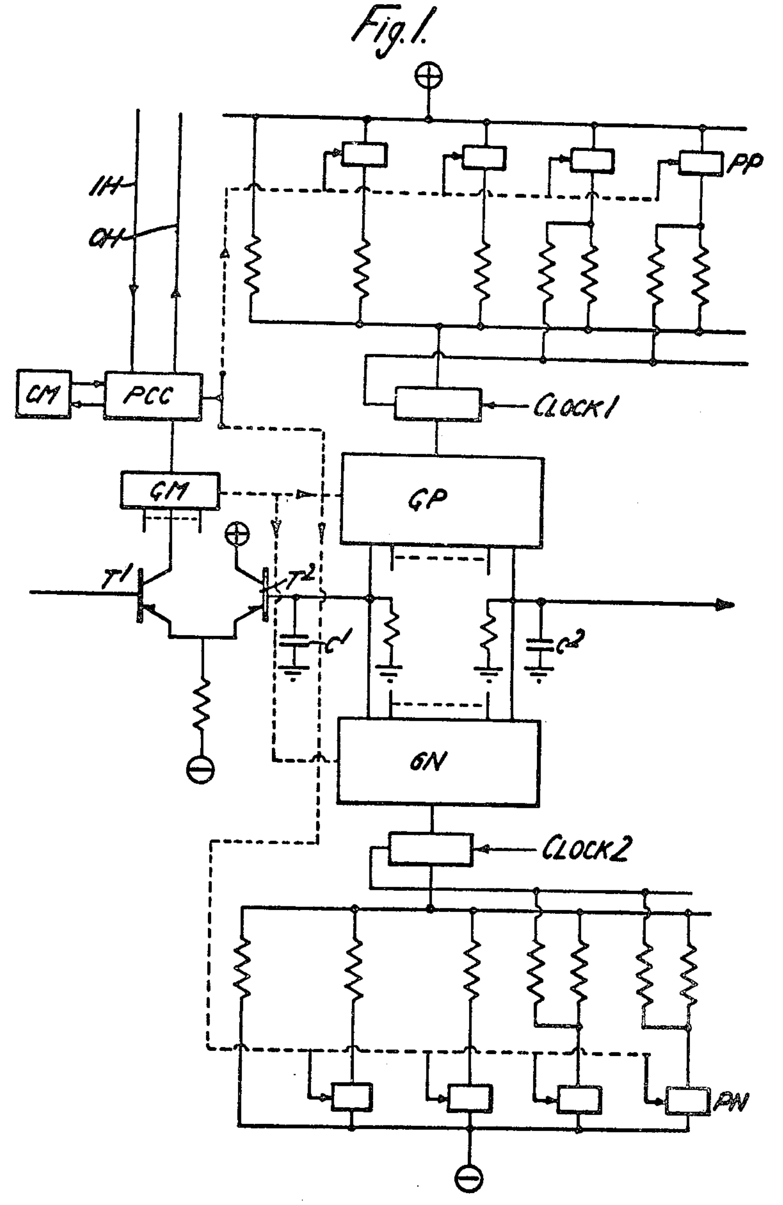
FIG. 1 represents schematically both a decoder and a coder for use in a system embodying the invention.

Before describing the drawings, it is felt that a general description of the pulse code modulation technique used will be helpful. The system described uses a form of pulse code modulation which resembles delta-modulation in that the code which is actually transmitted represents the difference between the amplitude of the current speech sample (assuming that the analog signal dealt with is speech) and the amplitude of the immediately preceding speech sample. The actual combination which is sent is based on a twelve-bit binary code combination, but only five consecutive bits are actually transmitted. The combination actually transmitted differs from the true binary code in that each element which is sent has the signification $+1$ or $-1$, positive and negative pulses being used for this purpose. However, it is also possible to represent the $+1$, $-1$, significations by the presence and absence of electrical pulses. Hence, in that case the two electrical conditions are "pulse" and "no-pulse," respectively.

When the sample amplitude calls for it, a shift of range is made, that is, the next higher or lower block of digits is sent: each such shift depending on the value of the last coding. Thus, for example, if the bit range in use is $2^0$–$2^4$, and the current sample amplitude exceeds 15 units, the range is left-shifted once, so that the bits sent are those for $2^1$–$2^5$ and so on.

Whenever the response to the current analog sample exceeds 15, considering the block of 5 bits in use as a simple binary number, a marker condition is set up, the presence or absence of which also exercises a controlling function on range shifting. Thus, for the range $2^0$–$2^4$, this marker is set up if the amplitude of the sample exceeds 15 units, for $2^1$–$2^5$ it is set up when the amplitude of the sample exceeds 31, for $2^2$–$2^6$, when it exceeds 63 and so on.

Whenever a marker condition is set up a recording to this effect is made in a cyclic memory, this memory also including recordings indicative of which range of binary elements is in use, and at intervals the cyclic memory is tested, for each time position channel, to see if a marker is present. In the present instance, it is assumed that this testing occurs on every 16th cycle, and if a marker is present it is cancelled from the memory but the range in use is not altered. However, if the test reveals that there is no marker, this is assumed by the equipment to be an indication that, since the last marker test, the sample amplitude has always been in the lowermost half of the amplitude range in use. Consequently, to improve accuracy of coding, the apparatus then shifts to the next lower range, for instance, a right-shift is effected from the range $2^3$–$2^7$ to the range $2^2$–$2^6$.

In the operation of coding, the first step in dealing with an analog quantity is to render effective a number (5 in the present case) of pairs of so-called pulsers, it being assumed in the present case that there are twelve pairs of pulsers. Each of these pairs of pulsers corresponds to one of the available binary element places, and the amplitude of the current pulse from a pulser depends upon its bit place. Each such pulser pair includes one pulser which feeds in a positive pulse, and one which feeds in a negative pulse. The initial choice is controlled by the cyclic memory referred to above, which could, for example, be a ferromagnetic core matrix having a row for each channel of the system, and this arrangement, although it chooses the pulsers to be used, does not make the choice between positive and negative.

After each operation of sampling and coding, an indication of the amplitude of the sample is stored. This is effected by charging a capacitor to a level dependent on the value of that sample, with the result that when a new sampling period occurs the capacitor for that channel bears a charge representative of the amplitude of the signal at the immediately preceding sampling. This last sampling level is then compared by a comparator with the new signal sample amplitude, and the comparator performs a sequence of comparisons equal in number to the number of digital elements to be transmitted, and as the result of each of these comparisons a positive or a negative pulse is gated into the capacitor to adjust its level to that of the new speech sample. Consequently, a code combination is generated which consists of a sequence of pulses each of which is either positive or negative, and which represents the difference in amplitude between the current speed sample and the immediately preceding one.

As an xample, if the stored level is that for 17 units, and the new sample amplitude is 28 units, assuming that the range $2^0$–$2^4$ is in use, we have:

(1) 28 exceeds the stored value 17, so *add* +16 to the storage capacitor to give 33 stored. The bit for this comparison is thus +1.

(2) The new stored value 33 exceeds the value 28 of the new speech sample, so add −8 to the storage capacitor to give 25 units stored. The bit for this comparison is consequently −1.

(3) The new speech sample 28 exceeds the content of the storage capacitor, 25 units, so add +4 to give 29 stored. The bit is therefore +1.

(4) 29 stored exceeds 28 (the speech sample), so add −2 to give 27 stored. The bit is therefore −1.

(5) 28 (new sample) exceeds 27 (stored), so add +1 to give 28 stored, which stored condition is retained until the next sample. The bit in this case is therefore +1.

Consequently, the code combination as a result of this sampling operation is +1, −1, +1, −1, +1, which represents 11 units. In addition, it will be seen that the storage capacitor has had its contents adjusted so that it now stores a charge representative of the new speech sample. This, as mentioned above, is retained until the next sampling. Since the response, that is, the difference in amplitude between the two consecutive speech samples, is less than 15 there is no marker insertion called for.

Consequently, it will be seen that the cyclic memory selects which pulsers, that is which bit weights, are needed, while the comparator controls selection between the pulsers of each pair, dependent on the results of the successive comparisons. If, during these comparisons, equality is attained before the last bit place, either a special operation could be effected to transmit a third condition indicative of this equality condition, or one could assume that a condition of equality was a positive difference. The latter would normally result in an error of 1 unit only, assuming that the lower-most range is in use. This error would normally be tolerable, being at least 30 db below the transmitted level, and would lead to a simpler system than that in which the third condition was transmitted.

The operation of decoding involves connecting the appropriate pulsers to an output capacitor charged to the level of the immediately preceding combination, and then reading this new level off, via smoothing circuits and such amplification as necessary. This connection of the pulsers can be effected in a number of successive steps equal to the number of bit places in use, or in two stages. In the latter case, in the first stage all of the pulsers which correspond to the combination to be decoded except that for the least significant one are connected to the storage capacitor, whereafter the least significant bit pulser is connected. This second method minimizer cross-talk between adjacent channels in a pluse code modulation time division multiplex system.

An advantage of the coding and decoding technique described above is that the same apparatus can function both the coding and the decoding. Furthermore, transmission of signals indicative of the range changes is not necessary in view of the nature of these range changes and the manner in which they occur. However, in some applications it may be found advisable to synchronise the range settings at the two ends of a link every $n$ sampling pulses. This information could be transmitted with the signalling information. Thus, it will be seen that before the first combination of any signal is sent, both ends of the system are set to the lower-most range, that is, to the range $2^0$–$2^4$ in the example referred to above. The first combination will, therefore, use the five least significant pulser pairs at the receiving end. From the incoming code combination it will, if needed, generate its own marker signal, and will also note from this combination when the value 15 units is exceeded. Thus, the decoder will, from what it receives, "know" when to effect left shift and right shift. For the initial signalling, before any shift has occurred, of course, the only shift which can occur is left shift. The cyclic memory at the receiving end can store data in the same manner as that at the coding end. Consequently, the coder and the decoder are essentially the same apparatus.

To avoid using a memory at both ends of a transmission link, it may be found more convenient to transmit the data relating to the position of the first pulser position relative to the full range of 12 positions. There are 8 possible positions and 3 binary digits can, therefore, represent this position.

If the code combination actually sent consists only of 4 digits instead of 5, the ratio between the largest and the smallest current pulse is reduced from 16–1 to 8–1, which makes the circuit less marginal in design, but requires a higher sampling frequency for the same ratio of signal to quantizing noise.

The apparatus of FIG. 1 shows both a coder and a decoder connected to the same set of pulses. It will be clear that normally the coder and the decoder for the same signal channel will be separated, normally being at opposite ends of a transmission medium, such as a coaxial cable or a telephone twisted pair, but FIG. 1 shows them together in the interest of simplicity. In addition, it will be appreciated that where, as is usually the case, bidirectional transmission is needed, each end of the channel would need both a coder and a decoder. In certain cases where the direction of transmission would not be in use at the same time, one circuit, such as FIG. 1, could handle coding and decoding.

Where, as would normally be the case, the coder/decoder arrangements are used in a multiplex system, gating means are used for controlling the "collection" of analog samples for supply to the coder and for "distributing," the results of the decoding at the receiving end.

The circuit shown in FIG. 1 includes both coder and decoder: the set of pulsers serves the coder for outgoing signals and also the decoder for incoming signals.

To describe FIG. 1, its operation will be briefly described. An audio signal to be sampled is applied to the base of a transistor T1 which, with transistor T2 forms part of a long-tailed pair comparator. There is one such comparator per channel in a multiplex system, there also being a capacitor C1 per channel in which is stored a charge representative of the channel's signal amplitude and polarity on the last sampling.

When the sampling time for the channel being considered occurs, the clock circuit causes the pulsers PP and PN to be connected via stages of gates indicated at GP and GN to the sampled channel's capacitor. These gating arrays can be conventional diode gating networks. The cyclic memory CM, which as already mentioned can be a co-ordinate matrix of ferrite elements with a row per channel, contains data as to what range of bit weights is in use, and this, via pulser control circuit PCC and the connections indicated by the dashed lines, selects the appropriate set of positive pulsers and negative pulsers. The circuit PCC includes buffers and gates in a conventional arrangement, and so is not described. The data from CM also sets the gates in GP and GN to the appropriate positions so that charges of suitable values can be steered to the correct capacitor.

The collector output of T1 depends on whether the sample is greater than or less than the charge on C1: the gate network GM responds to this to signal to the pulser control circuit PCC whether a positive or a negative pulser is to be selected. Thus, one pulser is selected and a pulse of appropraite polarity sent over the output highway OH. If the sense of the difference between the inputs to T1–T2 is unaltered, then the next lower pulser of the same polarity is selected, and so on until the sign changes. When the sign changes, the next lower pulser selected is, as already mentioned, of the other polarity. The speed of circuit operation is, of course, chosen to be adequate for this switching to be performed.

On reception, each pulse as it arrives over the input highway IH causes the control circuit PCC to select the appropriate pulser, positive or negative as indicated by the pulse characteristic. As already mentioned, the receiving equipment "knows" which range is in use. Hence, capacitor C2 charges to a level appropriate to the amplitude of the sample for the received signal and its output circuit extends via the usual filtering and amplifying circuitry.

The range-switching as and when needed is effected by the control circuit PCC under control of the contents of the cyclic memory CM, and the state of the capactior charges. Normally CM remembers the position of the 1st pair of pulsers to be used and the pulsers used in the next digit period are the pair to the right in the chain.

Figure 2:
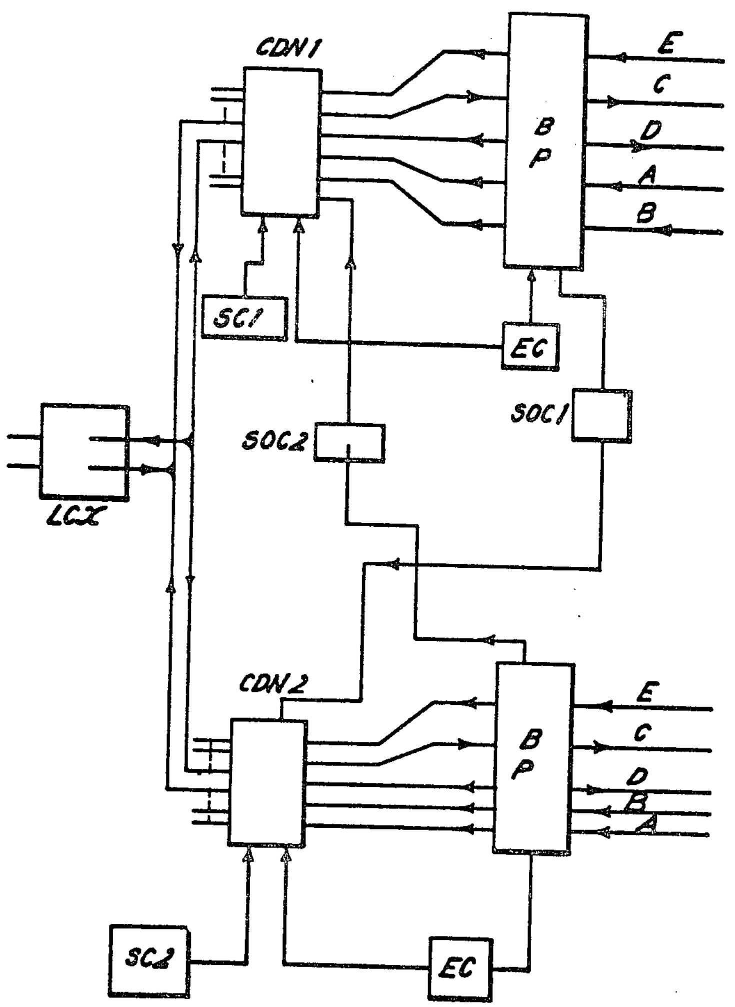
FIG. 2 shows in simplified, schematic form, a concentrator for use in a system wherein the present invention is employed.

The concentrator shown in simplified form in FIG. 2 includes a set of line circuits, one of which, LC*x* is shown, connected via coder-decoder networks CDN1 and CDN2 to the exchange BP. The duplication is in the interests of security and only one set of equipment will be described.

Association with the network CDN1 is a scanner SC1 and a controlling clock circuit EC.

The scanner causes lines to be tested for calling conditions and when one is found a signal is sent via the unit BP (which includes buffers, padders and synchronisation circuitry) and connection C to the main exchange so that the latter "knows" that a call has been initiated. Lead A is used to signal to the concentrator which gate is to be used for the next combination outgoing from the concentrator to be dealt with, i.e., to "tell" the concentrator which line should emit the next combination. Line B similarly carries signals identifying a line for which a combination is intended. The other two leads D and E are the outgoing and incoming highways, respectively.

The units SOC1 and SCO2 are switch over circuits for cutting out a faulty path in the concentrator and bringing another path into use.

Note in FIGURE 2 that each line circuit is available to both CDN1 and CDN2. If a fault occurs the faulty circuit is disconnected and the availability of this remote concentration is reduced by 50%, but all lines are still useable.

The digital links ABCDE are described as above for clarity. The signals may be intermixed for economy's sake.

It is to be understood that the foregoing description of specific examples of this invention is made by way of example only and is not to be considered as a limitation on its scope.

What I claim is:

1. A pulse code modulation system comprising a source of analog signal samples:

first means capable of producing a plurality of pairs of current pulses, each pair of current pulses having a different binary weight, each pair of current pulses of the same binary weight including a positive current pulse and a negative current pulse; and second means coupled to said source and said first means to select in sequence a given constant number of the most pertinent weighted, proper polarity current pulses of adjacent ones of said plurality of current pulses less than the total number thereof in accordance with the difference between the amplitudes of the present one of said signal samples and of the immediately preceding one of said signal samples and produce in sequence from said selected current pulses a combination of code elements equal to said given number to convey the amplitude information of said difference, each of said code elements having a binary weight corresponding to the binary weight of its associated one of said selected current pulses.

2. A system according to claim 1, wherein said second means detects when said produced combination of code elements represent a number exceeding a first limit and produces a range shift of said selected current pulses such that said selected current pulses have increased weights and detects when said produced combination of code elements represent a number less than a second limit and produces a range shift of said selected current pulses such that said selected current pulses are of lesser weights.

3. A system according to claim 2, wherein said second means detects when said produced combination of code elements represent a number between said first and second limits and records a marker condition therefore and at predetermined intervals tests for said marker condition causing a range shift of said selected current pulses so that said selected current pulses have lesser weights if said test does not find said marker condition and deleting said marker condition if said test finds said marker condition.

4. A system according to claim 1, wherein said system further includes means for handling analog signals at both ends of said system for a number of channels in time division multiplex manner; and storage means at both ends of said system for each of said channels for data identifying the range of said selected current pulses in use.

5. A system according to claim 4, wherein said storage means at the transmitting end of said system includes a capacitive storage device for each of said channels, each of said capacitive storage devices, after producing said producer combination of code elements for its associated one of said channels, including a charge whose value is equal to the amplitude of said present one of said signal samples; and further including at said transmitting end of said system first means to compare the amplitude of the next succeeding one of said signal samples of said associated one of said channels and the charge of its associated one of said capacitive storage devices to select said given number of current pulses and to adjust the charge of said associated one of said capacitive storage devices to be equal to the amplitude of said next succeeding one of said signal samples.

6. A system according to claim 4, wherein said storage means at the receiving end of said system includes:

a capactive storage device for each of said channels; and further including at said receiving end of said system second means responsive to said produced combination of code elements received on one of said channels to supply said given number of current increments, as determined by the weight of the code elements of said received combination of code elements, to an associated one of said capacitive storage devices which algebraically sums said current increments, said second means further being responsive to said received combination of code elements and said identifying data of said one of said channels to cause a range shift when necessary.

7. A pulse code modulation coder comprising:
an input for analog signal samples;
a storage device having a stored value therein equal to the amplitude of one of said signal samples;
a plurality of pairs of current sources, each of said pairs of sources having a different binary weight, each pair of sources of the same binary weight including a positive current source and a negative current source;
switching means coupled to each of said plurality of pairs of current sources;
comparator means coupled to said input and said storage device to compare the stored value on said storage device and the amplitude of a new one of said signal samples immediately succeeding said one of said signal samples; and
first means coupled to said comparator means and said switching means responsive to the sense of the difference between the compared quantities to cause said switching means to connect in sequence one of said sources of each of a given constant number of said pairs of sources of adjacent binary weights to said storage device, said given number being less than said plurality of pairs of current sources;
said comparator means making a comparison after each of said one of said sources of each of said given constant number of said pairs of sources is sequentially connected to said storage device;
said one of said sources of each of said given constant number of said pair of sources being said negative current source if said new one of said signal samples is less than said stored value and said positive current source if said new one of said signal samples is greater than said stored value;
said switching means further generating a code combination having said given constant number of code elements, said given constant number of code elements being represented by a pulse of a first electrical condition for each connection of a positive current source to said storage device and a pulse of a second electrical condition for each connection of a negative current source to said storage device;
said first means further being responsive to the number represented by said code combination exceeding a first limit to cause said switching means to operate on said given constant number of said pairs of sources having increased binary weights and being responsive to the number represented by said code combination below a second limit to cause said switching means to operate on said given constant number of said pairs of sources having reduced binary weights.

8. A coder according to claim 7, wherein
said first means further responds to the number represented by said code combination between said first and second limits and records a marker condition therefore and tests for said marker condition at predetermined intervals, the presence of said marker condition causing deletion thereof and the absence of said marker condition causing said switching means to operate on said given constant number of said pairs of sources having reduced binary weights.

9. A coder according to claim 8, wherein
said input includes a plurality of inputs one for each of a different one of time multiplexed signal channels;
said storage device includes a storage device for each of said signal channels;
said comparator means includes a comparator means for each of said signal channels; and
said plurality of pairs of current sources, said switching means, and said first means are coupled in common to all of said signal channels.

10. A coder according to claim 9, wherein said first means includes a cyclic memory having a storage section for each of said signal channels to store therein data indicative of said given constant number of said pairs of sources used and said marker condition if present for its associated one of said signal channels.

11. A pulse code modulation decoder comprising:
an input for received code combinations each including a given constant number of binary code elements representing the amplitude difference between a given analog signal sample and an immediately preceding analog signal sample, each of said code elements having a different adjacent binary weight and represented by a first electrical value for one binary condition and by a second electrical value different than said first value for the other binary condition;
a plurality of pairs of current sources greater in number than said given constant number, each of said pairs of current sources having a different binary weight and each source of said pair of sources of the same binary weight provides a current of the same magnitude but opposite polarity;
first means coupled to said input and said plurality of pairs of current sources responsive to each of said received code combinations to select said given constant number of said plurality of pairs of current sources having binary weights corresponding to the binary weights of said code elements of the associated one of said received code combinations, to select the source of each of said selected pair of current sources providing the polarity of current as determined by the electrical value of each of said code elements of said associated one of said received code combinations, to detect when the value of the number represented by said associated one of said received code combinations exceeds a first level so that the next succeeding one of said received code combinations uses a selection of said given constant number of said plurality of pairs of current sources having higher binary weights, and to detect when the value of the number represented by said associated one of said received code combinations is lower than a second level so that the next succeeding one of said received code combinations uses a selection of said given constant number of said plurality of pairs of current sources having a lower binary weights; and
a storage means having a charge thereon equal to the amplitude of said immediately preceding analog signal sample coupled to said plurality of pairs of current source to sum algebraically the currents applied thereto from said selected pairs of current sources to provide an analog output representing the amplitude of said given analog signal sample.

References Cited

UNITED STATES PATENTS

| | | | |
|---|---|---|---|
| 2,759,998 | 8/1956 | Labin et al. | 178—43.5 |
| 2,770,777 | 11/1956 | Feissel | 332—1 |
| 3,201,777 | 8/1965 | Brown | 340—345 |
| 3,241,135 | 3/1966 | Kuflik et al. | 340—347 |
| 3,310,743 | 3/1967 | Cleobury et al. | 325—321 |
| 3,335,409 | 8/1967 | Heller et al. | 340—172.5 |
| 3,393,364 | 7/1968 | Fine | 325—38 |
| 3,403,226 | 9/1968 | Wintringham | 325—38 |

FOREIGN PATENTS

| | | |
|---|---|---|
| 1,039,341 | 8/1966 | England. |
| 6,400,538 | 7/1964 | Netherlands. |

RICHARD MURRAY, Primary Examiner
C. R. VONHELLENS, Assistant Examiner

U.S. Cl. X.R.

325—38